United States Patent [19]

Giraudeau

[11] 3,833,086
[45] Sept. 3, 1974

[54] SOUND AND VIBRATION INSULATING PANEL

[76] Inventor: Andre Giraudeau, 3 Rue de La Republique, 95160 Montmorency, France

[22] Filed: Aug. 10, 1972

[21] Appl. No.: 279,519

[30] Foreign Application Priority Data
Aug. 10, 1971  France .............................. 71.29241

[52] U.S. Cl. ............. 181/33 A, 181/33 G, 161/119, 161/127, 248/22, 248/358 R
[51] Int. Cl. .............................................. E04b 1/84
[58] Field of Search ............................... 248/19–24, 248/358; 188/1 B, 33 A, 33 G, 33 K, 33 R; 161/119–123, 127

[56] References Cited
UNITED STATES PATENTS

| | | | |
|---|---|---|---|
| 2,353,945 | 7/1944 | Storch | 248/358 R |
| 2,697,578 | 12/1954 | Whittam | 248/22 X |
| 3,146,979 | 9/1964 | Keetch | 248/20 |
| 3,231,256 | 1/1966 | Olson | 248/358 R X |
| 3,268,199 | 8/1966 | Kordyban et al. | 248/21 UX |
| 3,525,417 | 8/1970 | Giraudeau | 181/33 G |
| 3,602,465 | 8/1971 | Velut | 248/358 R X |

FOREIGN PATENTS OR APPLICATIONS

| | | | |
|---|---|---|---|
| 782,089 | 3/1935 | France | 248/22 |
| 70,221 | 6/1952 | Netherlands | 181/33 G |

Primary Examiner—Richard B. Wilkinson
Assistant Examiner—John F. Gonzales
Attorney, Agent, or Firm—Eyre, Mann & Lucas

[57] ABSTRACT

A sound and vibration insulating panel is made of an elastomer material and includes upper and lower plates with annular ridges lying opposite one another. When assembled on an intermediate member having annular ridges on both faces, the two plates have their respective ridges interdigitating the ridges of the intermediate member.

3 Claims, 2 Drawing Figures

SOUND AND VIBRATION INSULATING PANEL

BACKGROUND OF THE INVENTION

1. Field of the Invention.

This invention relates to a panel of an elastomer material for providing sound and vibration insulation.

2. Description of the Prior Art.

In a previous proposal, the panel comprises two members substantially equal in size to the whole surface of the panel and each of which has longitudinal recesses, the recesses of one member being disposed opposite the recesses of the other member, and a series of auxiliary members of smaller size which are disposed in these recesses and of which the height is substantially equal to that of the said recesses. The recesses of the auxiliary member may be independent of or interconnected by parts of small size.

SUMMARY OF THE INVENTION

According to the present invention, there is provided a sound and vibration insulating panel comprising a pair of plates each including means defining a plurality of annular recesses, the recesses of one plate lying opposite the recesses of the other plate, and a plurality of annular members each engaged in a respective opposed pair of said recesses and extending to the base of each respective recess.

The panel may be used as a shock absorbing device or as the base of a machine tool, such as a press, a power-hammer, milling machine, lathe or drilling machine.

It may, if desired, include a centering skirt.

DESCRIPTION OF PREFERRED EMBODIMENT

Figure 1:
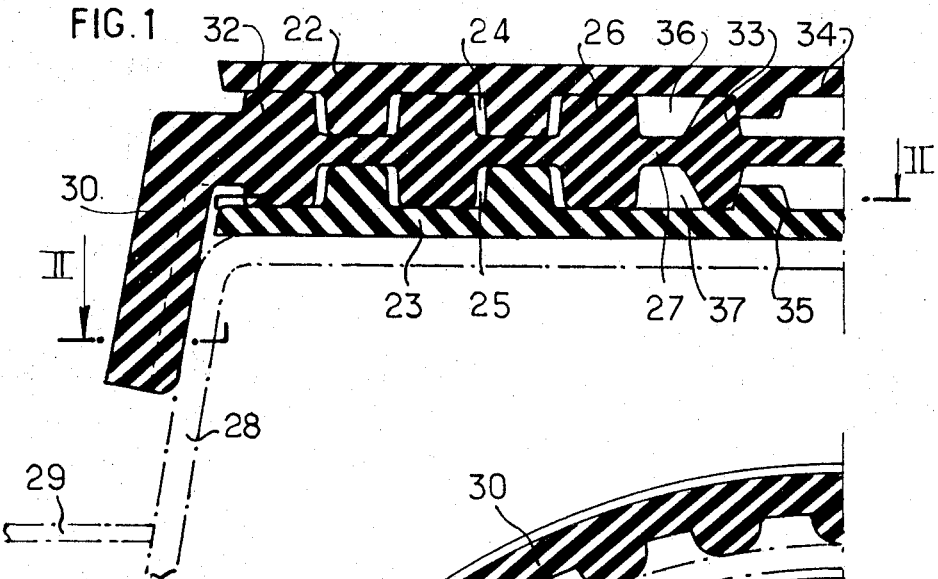
FIG. 1 is an axial section of the support.
Figure 2:
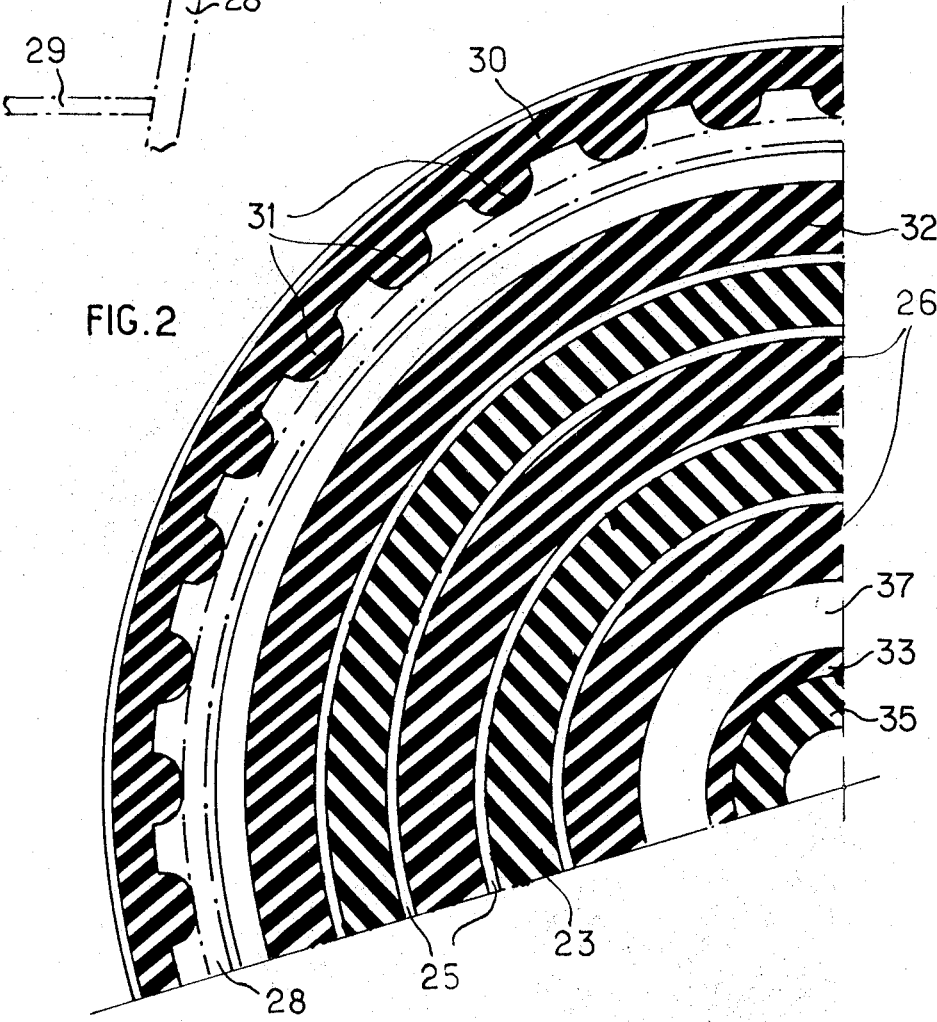
FIG. 2 is a transverse section on the line II—II of FIG. 1.

As is shown in the drawing, the support in accordance with the invention comprises two plate members 22 and 23, which have, in plan, a circular form and have annular recesses 24 and 25, the recesses 24 being disposed opposite the recesses 25. Ridges lie between the recesses.

In the recesses 24 and 25 annular members 26 are engaged of which the height is substantially equal to the distance lying between the bases of the recesses 24 and of the recesses 25 and of which the radial dimension is less than that of the recesses; the members 26 are interconnected by parts of small thickness 27.

The support which has just been described is intended to be mounted on a frusto-conical boss 28 of a member 29. The assembly formed by the member 26 and the parts 27 is extended laterally to form a centering skirt 30 extending from and integral with outermost annular member 32 which is provided internally with teeth 31 and which can engage on the boss 28. Annular member 33 engages opposed ridges 34 and 35 of opposed recesses 36 and 37 to prevent radial movement of opposed plates 22 and 23.

The various members of the support are made of elastomer material.

What is claimed is:

1. A sound and vibration insulating panel comprising:

a pair of resilient plates each including a plurality of annular recesses, the recesses of one plate lying opposite the recesses of the other plate;

a plurality of annular members each engaged in a respective opposed pair of said recesses and extending to the base of each respective recess; and means for centering said panel on a mount having an inner side contacting said mount and comprising a resilient elongated projection integral with and extending from an outer one of said annular members.

2. A panel according to claim 1, wherein said centering means is frusto-conical in outline shape.

3. A panel according to claim 1 wherein said centering means further comprises teeth positioned on said inner side to frictionally engage said panel with said mount.

* * * * *